(12) United States Patent
Delorme et al.

(10) Patent No.: US 8,761,046 B2
(45) Date of Patent: Jun. 24, 2014

(54) COMMUNICATION SYSTEM AND METHOD (75) Inventors: Flavien Delorme, Vence (FR); Bruno De Smet, Valbonne (FR); Farouk Belghoul, Les Bols Mures (FR)

(73) Assignee: Nvidia Corporation, Santa Clara, CA (US)

( * ) Notice: Subject to any disclaimer, the term of this patent is extended or adjusted under 35 U.S.C. 154(b) by 95 days.

(21) Appl. No.: 13/314,436

(22) Filed: Dec. 8, 2011

(65) Prior Publication Data

US 2013/0148572 A1 Jun. 13, 2013

(51) Int. Cl.
*H04L 12/28* (2006.01)
(52) U.S. Cl.
USPC .......................................... 370/254
(58) Field of Classification Search
None
See application file for complete search history.

(56) References Cited

U.S. PATENT DOCUMENTS

| | | | |
|---|---|---|---|
| 8,255,491 B1* | 8/2012 | Arzur | 709/219 |
| 2008/0057957 A1* | 3/2008 | Altbaum et al. | 455/435.1 |
| 2010/0332680 A1* | 12/2010 | Anderson et al. | 709/245 |
| 2011/0238792 A1* | 9/2011 | Phillips et al. | 709/220 |

* cited by examiner

*Primary Examiner* — Raj Jain (57) ABSTRACT

A modem is disclosed that, in one embodiment, includes: first interface apparatus comprising a first wireless transceiver arranged to connect to a wireless cellular network; second interface apparatus arranged to connect to the terminal; and processing apparatus configured as a wireless cellular modem for accessing packet-based communications. The processing apparatus is arranged to receive at least one first address from the wireless cellular network via the first interface apparatus, the first address being an address of a server of a name-to-address resolution system. The processing apparatus is further configured to intercept, via the second interface apparatus, a name-to-address resolution query being conveyed from the terminal to the wireless cellular network comprising a second address as a destination address, to translate the second address into the first address, and to retransmit the query to the wireless cellular network via the first interface apparatus with the first address as the destination address.

34 Claims, 3 Drawing Sheets

COMMUNICATION SYSTEM AND METHOD

TECHNICAL FIELD

The application relates to accessing packet-switched communications via a wireless cellular network, e.g., accessing the Internet via a 3GPP network.

BACKGROUND

Figure 1:
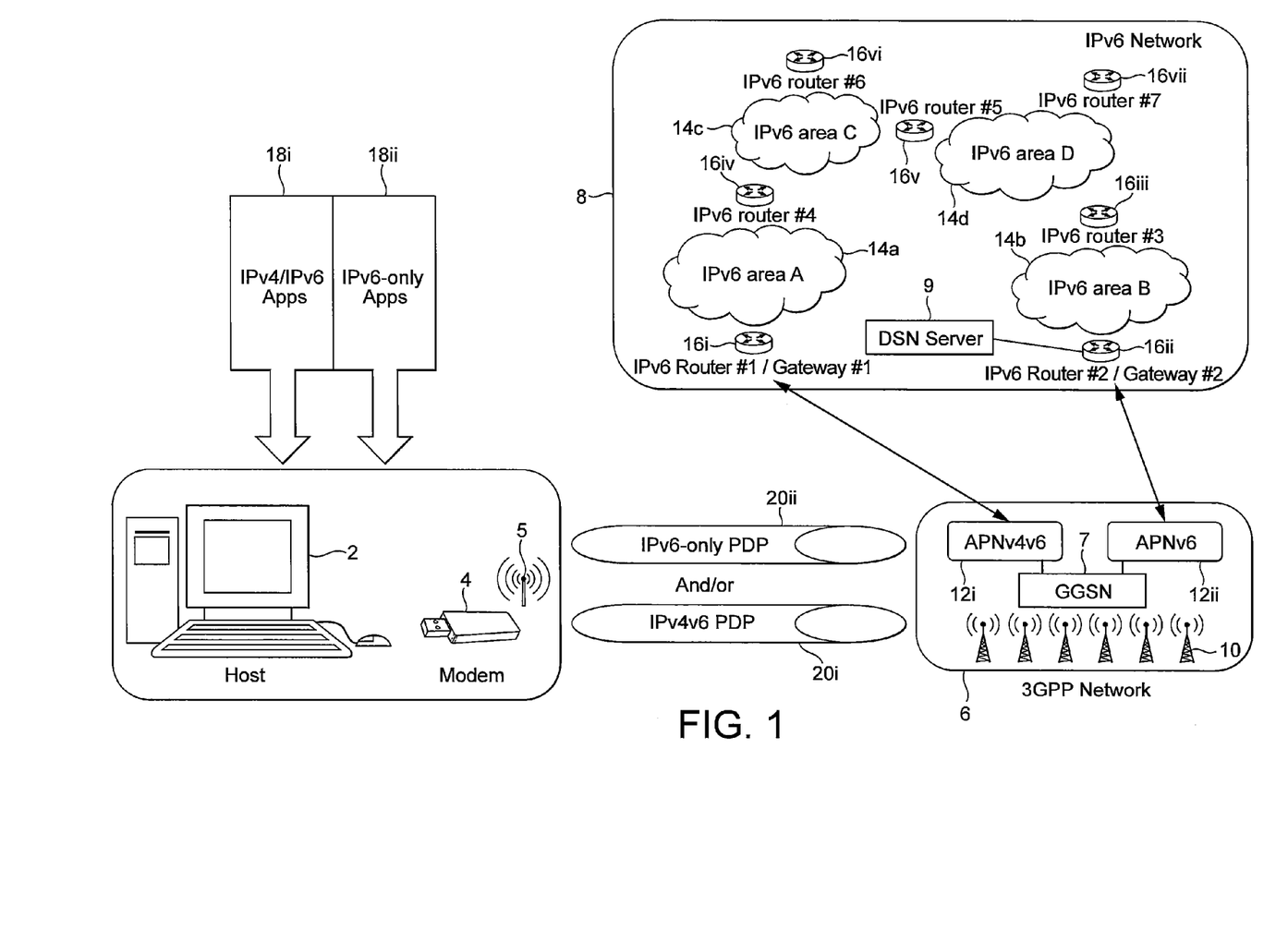
FIG. 1 is a schematic illustration of a modem and host configuration.

FIG. 1 is a schematic block diagram of a communication system comprising a host terminal 2 and an external wireless cellular modem 4, the modem 4 comprising an antenna 5. The host terminal 2 may be a user terminal, and may for example take the form of a desktop computer, laptop computer, tablet style computer, or mobile phone (which may be referred to as a "smart phone"). The modem 4 may for example take the form of a dongle for plugging into the host terminal 2. Alternatively the modem 4 may take the form of a mobile phone handset which, as well as being a conventional mobile telephone, can be connected to the host terminal 2 so as to act as an external cellular modem for the host terminal 2. The modem 4 is external to the host terminal 2 in that it is a separate unit housed in a separate casing, but which is connected or connectable to the host terminal 2 by means of a wired or wireless connection (as well as being removable or being able to be disconnected from the host terminal 2). In another alternative set up, the modem 4 could be internal to the terminal 4, e.g. taking the form of a wireless module in a desktop or laptop computer.

The system also comprises a mobile cellular network 6 such as a 3GPP network; and a further, packet-based network 8, such as a wide area internetwork such as the Internet. The mobile network 6 comprises a plurality of antennas 10, and a router 16 connecting between the mobile network 6 and the further, packet-based network 8 (a router connected in this manner may be called a gateway and could be considered a component of either or both the mobile network 6 and the further network 8, but for illustrative purposes is shown in the mobile network 6 in FIG. 1). The mobile network 6 further comprises a gateway support entity 7 operatively coupled to the antennas 10 and the router 16. For example the gateway support entity may be a GGSN (Gateway GPRS Support Node) in a 2G or 3G system, or an SAE (System Architecture Evolution) gateway in a LTE (Long Term Evolution) system. The GGSN 7 or other such node may comprise one or more access points, e.g. in the form of one or more instances of a suitable access point protocol such as one or more APNs (access point names).

For connecting to the 3GPP network 6 or other such cellular network, the modem 4 comprises first physical interface apparatus comprising a wireless transceiver, typically in the form of a radio frequency (RF) transceiver and an antenna 5. This interface apparatus of the modem 4 connects via an antenna 10 of the cellular network 6 to an access point of the gateway support entity, e.g. the GGSN 7. For example, if the mobile cellular network 6 is a 3GPP network, then the connection between the modem 4 and a 3GPP network may be called a PDP (Packet Data Protocol) context in 2G or 3G terminology, and an EPS (Evolved Packet System) bearer context in LTE terminology. The physical medium of the connection is typically a radio channel such as a 2G, 3G or LTE radio channel and the protocol that drives it may comprise a set of protocol layers as defined for example by 3GPP. Each of the one or more access points of the GGSN 7 then provides a connection onwards to the gateway router 16 and via that router to the Internet 8.

For connecting to the host terminal 2, the modem 4 comprises second physical interface apparatus. The second interface, between the host 2 and modem 4, could for example comprise a wired connector such as USB connector for plugging into the host terminal 2, or a short-range wireless transceiver such as an infrared connection or a radio frequency connection (e.g. Bluetooth) for connecting wirelessly to the host terminal 2 via a local wireless connection.

The host terminal 2 is installed with one or more applications 18 which when executed on the host terminal 2 send and/or receive communications over the Internet 8 via the first and second interface apparatuses, wireless cellular network 6 and the relevant gateway 16, via the established context, supported by the GGSN 7. The system allows the host terminal to access the Internet 8, e.g. using Internet Protocol version 6 (IPv6).

When a terminal accesses the Internet 8, e.g. to view a website or send an email, it uses a name-to-address resolution system such as a domain name system (DNS). A domain name is a human-recognizable name or label, typically a text string, which is meaningful to a user so as to identify an IP resource from the perspective of the user. For instance the resource could be a web site or an email destination, and the domain name could take the form "www.example.com" for a website or "example@example.com" for email. A domain name system is a naming system associating human-recognizable domain names with various information including a less user-friendly address or numerical identifier such as a numerical IP address. That is, the domain name system or other such name-to-address resolution system maps the human-recognizable name of an internet resource (that will be used by the user to identify the resource) to a computer-readable network address that identifies the location of the resource on the Internet or other such packet-based network (and that will be used by routers to identify the resource as a source and/or destination of a packet or message being sent to or from that resource).

In order to access a desired Internet resource, a user of the terminal inputs a domain name of the resource into an application running on that terminal such as a web browser or email client. The application or operating system then sends a name-to-address query in the form of a DNS query to a name-to-address resolution server in the form of a domain name server, e.g. a DNSv6 server in the case of IPv6. This kind of server is also sometimes just called a "name server". A DNS server is a network entity responsible for resolving the translation of domain name into IP address, or recursively asking other name servers until full resolution is achieved. That is, when the DNS server receives a query from a terminal, it looks-up the queried domain name in its own records to determine whether it can resolve the query itself (either because it is the authoritative server for that domain name or because it has cached the result of a previous query). If so it returns a response comprising the corresponding IP address to the terminal that requested it. If the DNS server cannot resolve the request itself on the other hand, it may in turn contact one or more other DNS servers to query whether they can resolve the address. Once the required address is found, it is returned to the terminal. Some DNS servers 9 and 9' are shown in FIG. 1, although it will be appreciated that many more would be present on the Internet 8 than are shown.

In order to make use of such a system, a terminal is typically configured with an address of at least one designated DNS server in which to send its DNS queries. In a 3GPP environment for example, the DNS server addresses are provided to the modem by the GGSN in Packet Configuration Option field of various messages such as Activate PDP Context Accept.

SUMMARY

According to one aspect of the disclosure, there is provided a modem for use at a terminal. In one embodiment, the modem includes: first interface apparatus comprising a first wireless transceiver arranged to connect to a wireless cellular network; second interface apparatus arranged to connect to the terminal; and processing apparatus configured to perform operations of a wireless cellular modem so as to enable the terminal to access packet-based communications via the second interface apparatus, first interface apparatus and wireless cellular network; wherein the processing apparatus is arranged to receive at least one first address from the wireless cellular network via the first interface apparatus, the first address being an address of a server of a name-to-address resolution system; and wherein the processing apparatus is configured to intercept, via the second interface apparatus, a name-to-address resolution query being conveyed from the terminal to the wireless cellular network comprising a second address as a destination address, to translate the second address into the first address, and to retransmit the query to the wireless cellular network via the first interface apparatus with the first address as the destination address so as to access the packet-based communications.

According to another aspect of the disclosure, there is provided a computer program product for operating a modem for use at a terminal, the modem having a processing apparatus, a first interface apparatus including a first wireless transceiver for connecting to a wireless cellular network, and a second interface apparatus for connecting to the terminal; wherein the computer program product comprises code embodied on a non-transitory computer-readable medium and configured so as when executed on the processing apparatus of said modem to perform operations of a wireless cellular modem so as to enable the terminal to access packet-based communications via the second interface apparatus, first interface apparatus and wireless cellular network. In one embodiment, the operations to perform include: receiving a first address from the wireless cellular network via the first interface apparatus, the first address being an address of a server of a name-to-address resolution system; intercepting, via the second interface apparatus, a name-to-address resolution query being conveyed from the terminal to the wireless cellular network comprising a second address as a destination address; translating the second address into the first address; and retransmitting the query to the wireless cellular network via the first interface apparatus with the first address as the destination address so as to access the packet-based communications.

According to yet another aspect of the disclosure, there is provided a method of operating a modem connected to a terminal, the modem having a first interface apparatus comprising a first wireless transceiver for connecting to a wireless cellular network, a second interface apparatus for connecting to the terminal, and a processing apparatus for performing operations of a wireless cellular modem so as to enable the terminal to access packet-based communications via the second interface apparatus, first interface apparatus and wireless cellular network. In one embodiment, the method includes: at the processing apparatus of said modem, receiving a first address from the wireless cellular network via the first interface apparatus, the first address being an address of a server of a name-to-address resolution system; intercepting at the processing apparatus of said modem, via the second interface apparatus, a name-to-address resolution query being conveyed from the terminal to the wireless cellular network comprising a second address as a destination address; at the processing apparatus of said modem, translating the second address into the first address; and from the processing apparatus of said modem, retransmitting the query to the wireless cellular network via the first interface apparatus with the first address as the destination address so as to access the packet-based communications.

According to still another aspect of the disclosure, a system is provided. In one embodiment, the system includes: a terminal; a wireless cellular network; and a modem for use at the terminal, the modem having a first interface apparatus including a first wireless transceiver for connecting to the wireless cellular network, a second interface apparatus for connecting to the terminal, and processing apparatus configured to perform operations of a wireless cellular modem so as to enable the terminal to access packet-based communications via the first interface apparatus, second interface apparatus and wireless cellular network; wherein the processing apparatus is arranged to receive a first address from the wireless cellular network via the first interface apparatus, the first address being an address of a server of a name-to-address resolution system; and wherein the processing apparatus is configured to intercept, via the second interface apparatus, a name-to-address resolution query being conveyed from the terminal to the wireless cellular network comprising a second address as a destination address, to translate the second address into the first address, and to retransmit the query to the wireless cellular network via the first interface apparatus with the first address as the destination address so as to access the packet-based communications.

BRIEF DESCRIPTION

For a better understanding of the disclosure and to show how it may be put into effect, reference by way of example is made to the accompanying drawings in which.

DETAILED DESCRIPTION

However, even when employing a host terminal, a problem can occur where a host terminal and its modem are two separate entities, e.g. communicating through a standard interface such as PPP (point-to-point protocol) or NDIS (Network Driver Interface Specification). In this kind of set up, the mobile cellular network may provide the modem with an address of a name-to-address resolution server intended for use in name-to-address resolution queries, but in some circumstances this address may not actually end up being used by the host terminal, for example because it may not be possible to provide these addresses to the host terminal.

For example, one such scenario occurs when the GGSN 7 provides an external modem 4 with an address of one or more designated DNS servers 9, but the operating system on the host terminal 2 doesn't offer a standard way of automatically configuring a DNSv6 address—so that the external modem 4 does not have a way of making the operating system on the host 2 adopt the designated DNS address. In this case either the user has to enter the one or more DNS addresses manually at the host 2 or a residing application 18 has to retrieve the addresses from the modem 4 and force them into an interface configuration for the host 2. Entering the DNS address manually is inconvenient for the user, and not all users will have the technical expertise to do this. On the other hand the latter possibility is dependent on the application 18 and not all applications will necessarily be programmed to retrieve or be able to retrieve the DNS address designated by the GGSN 7 from an external modem 4. If neither the user nor the application 18 is able to provide or retrieve a designated DNS address so that the host 2 has no DNS address configured, the host 2 may use one or more default local addresses (also called "well known DNS addresses"). However, the default address may not be the address of a preferred DNS server or servers 9, 9', or may not be an address of an actual available DNS server at all.

A similar problem can occur in any scenario in which a terminal attempts to access packet-based communications via a modem and wireless cellular network, but where the terminal sends out a name-to-address resolution query using a destination address other than the address of a name-to-address resolution server provided to the modem by the wireless cellular network.

As such, this disclosure relates to the provision of addresses of one or more domain name servers for use when accessing packet-switched communications via a wireless cellular network, e.g., accessing the Internet via a 3GPP network. The disclosure provides a modem including a first interface apparatus having a first wireless transceiver arranged to connect to a wireless cellular network, second interface apparatus arranged to connect to the terminal and processing apparatus configured to perform operations of a wireless cellular modem so as to enable the terminal to access packet-based communications via the second interface apparatus, first interface apparatus and wireless cellular network. In embodiments, the processing apparatus may be configured such that access to packet-based communications comprises access to a further, packet-based network via the wireless cellular network; and the query may be so as to access the further network via the wireless cellular network.

The processing apparatus may be configured to send a request message via the first interface apparatus requesting establishment of a context with the wireless cellular network, and in response to receive back an acceptance message from the wireless cellular network accepting establishment of the context, wherein the acceptance message may comprise at least one first address.

The processing apparatus may be configured to intercept at least one name-to-address resolution response being conveyed from the server comprising the first address as a source address, to translate the first address into the second address, and to retransmit the response to the wireless cellular network with the second address as the source address. The processing apparatus may be configured to receive a plurality of first addresses from the wireless cellular network via the first interface apparatus, each first address being an address of a respective server of a name-to-address resolution system, and the processing apparatus may be further configured to intercept, via the second interface apparatus, a name-to-address resolution query being conveyed from the terminal to the wireless cellular network comprising any one of a plurality of second addresses as a destination address, to translate the one of the second addresses into a respective one of the first addresses, and to retransmit the query to the wireless cellular network with the respective first address as the destination address so as to access the packet-based communications. The second address may be a default address generated by the terminal.

In one embodiment, the processing apparatus may be unable to cause the terminal to accept the first address. The processing apparatus may be configured to detect that the second address is not the at least one first address, and to perform the translation on condition of the first interface apparatus including a first wireless transceiver arranged to connect to a wireless cellular network, second interface apparatus arranged to connect to the terminal, and processing apparatus configured to perform operations of a wireless cellular modem so as to enable the terminal to access packet-based communications via the second interface apparatus, first interface apparatus and wireless cellular network the detection.

The processing apparatus may be configured to detect that the second address is a default address, and to perform the translation on condition of the detection. The second address may be a default address generated by an operating system of the terminal. In one embodiment, the processing apparatus may be unable to cause the terminal to accept the first address due to the operating system of the terminal.

In some embodiments, the further network may be the Internet and the wireless cellular network may be a 3GPP network. Additionally, the second interface apparatus may include a wired connector or connection and the modem may comprise an external unit for use at the terminal. The second interface apparatus can comprise a wired connector.

In one embodiment, the modem may include a dongle housing the processing apparatus and for plugging into the terminal via the second interface apparatus. The second interface apparatus may comprise a second wireless transceiver for connecting to the terminal via a local wireless connection.

In some embodiments, the modem may comprise a mobile phone housing the processing apparatus and for connecting to the terminal via the second interface apparatus, the mobile phone thus being operable as a telephone and as an external wireless cellular modem for the terminal.

The disclosure also provides a computer program product with code, a method of operating a modem and a system. In embodiments, the code may be configured so as when executed to perform operations in accordance with the operation of any of the possible features of the modem set out above. Additionally, in some embodiments, the method may include operations in accordance with the operation of any of the possible features of the modem set out above. The system may also be configured in accordance with any of the possible features of the modem set out above.

The following embodiments apply to a configuration where a host terminal and modem are two separate entities communicating with each other for instance through a USB connection or local wireless connection.

Reference is made again to FIG. 1, which shows a communication system in which embodiments of the disclosure may be applied. The host 2 may be any device such as a PC, laptop, or application processor connected to the modem 4 in order to obtain access to the packet-based network 8 via the modem 4 and cellular network 6, e.g. to get IPv6 connectivity and send and/or receive IPv6 traffic. The modem 4 is the device that provides a way to send and receive packets between the host 2 and cellular network 6, e.g. to send and receive IPv6 packets between the host and the 3GPP network.

Figure 3:
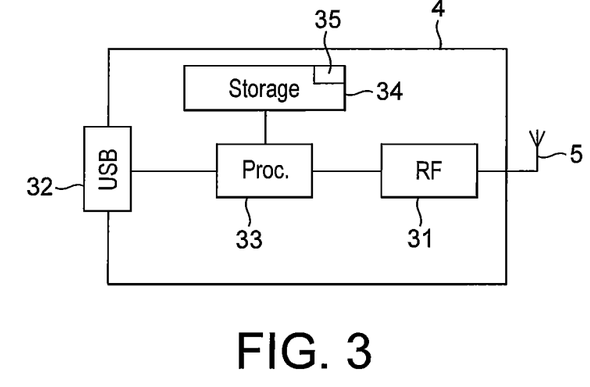
FIG. 3 is a schematic block diagram of an external modem unit for use at a host terminal.

Referring to FIG. 3, the modem 4 may comprise a processor 33 and, operatively coupled to the processor 33, a non-transitory computer-readable storage medium 34 such as a magnetic or electronic memory storing soft-modem code.

The code on the storage medium 34 is arranged to be executed on the processor 33, so as when executed to send and receive packets between the host 2 and Internet 8 or other such packet-based network via the cellular network 6, and to perform the additional operations of the modem 4 as discussed below. However, the possibility of some or all of the modem functionality being implemented in dedicated hardware is not excluded.

As mentioned, the modem 4 may for example take the form of a dongle for plugging into the host terminal 2; or may take the form of a mobile phone handset which, as well as being a conventional mobile telephone, can be connected to the host terminal 2 so as to act as an external cellular modem for the host terminal 2. The modem 4 is external to the host terminal 2 in that it is a separate unit housed in a separate casing, but which is connected or connectable to the host terminal 2 by means of a wired or wireless connection (as well as being removable or being able to be disconnected from the host terminal 2). The modem may be configured in a similar manner to that discussed in relation to FIG. 1 above, but with additional functionality added in accordance with the disclosure, an example of which will be discussed in more detail below in relation to FIG. 2.

The cellular network 6 can be a 3GPP network, which connects the modem 4 to a further, packet-based network 8 such as an IPv6 network, that can be the form of a wide area internetwork such as the Internet. For connecting to the 3GPP network 6 or other such cellular network, the modem 4 comprises first physical interface apparatus comprising a wireless transceiver 31, typically in the form of a radio frequency (RF) transceiver, and an antenna 5. The transceiver 31 is operatively coupled to the processing apparatus 33. The connection between the modem 4 and the access point of the GGSN 7 (or SAE gateway or the like) of the cellular 3GPP network, and therefore between the modem 4 and gateway router 16 to the IPv6 network 8, comprises one or more contexts 20 in the form of one or more PDP contexts or one or more EPS bearer contexts. A connection could be made of one or several bearer (s) called PDP context(s) or EPS bearer context(s). In embodiments, each context may provide a point-to-point connection between the modem 4 and the relevant gateway 16.

For connecting the external modem 4 to its host terminal 2, the modem 4 comprises second physical interface apparatus 32 operatively coupled to the processing apparatus 33. This second interface 32, between the host 2 and modem 4, could for example comprise a wired connection such as USB connector, or a short-range wireless transceiver such as an infrared connection or a radio frequency connection (e.g. Bluetooth).

The 3GPP network 6 further comprises one or more DNS servers 9, operatively coupled to the gateway router 16 and GGSN 7. The Internet 8 also comprises a plurality of DNS servers 9'. These DNS servers are provided so as to allow a terminal such as the host terminal 2 to make DNS queries according to a domain name system. That is, a user of the host terminal 2 inputs a human-recognizable domain name of a desired IP resource into an application 18 running on the host terminal 2, e.g. by inputting a web address into a web browser or an email address into an email client. The host terminal 2 then formulates a DNS query comprising the domain name and a destination IP address, e.g. the query could be formulated by the application 18 or by the operating system on the host terminal 2. If the host terminal 2 is properly configured with the address of at least one designated DNS server, then it will be able to formulate a query in which the destination address is the address of the designated DNS server 9 or 9', to which the query is to be sent. The DNS query is then sent to that DNS server via the modem 4 and 3GPP network 6, over the PDP or EPS context 20 established with the APN of the GGSN 7.

The queried DNS server 9 or 9' then acts to try to resolve the DNS query using a DNS resolution process as discussed above. That is, each DNS server 9, 9' maintains a database and/or cache of information mapping a certain subset of domain names to corresponding IP addresses. When it receives a DNS query, it looks up the queried domain name in its own database and/or cache to determine whether it has the queried domain name there, and if so responds to the DNS query by sending back the corresponding IP address to the terminal 2 that queried it. If the queried DNS server 9 or 9' does not have the queried domain name in its own database or cache however, it may in turn send a query to one or more other DNS servers 9 or 9' querying the desired domain name. Once a DNS server 9 or 9' is found that does have the queried domain name in its cache or database, it responds to DNS server that queried it. The designated DNS server that was queried by the terminal 2 is thus able to send a response back to the terminal 2 providing the IP address corresponding to the domain name of the desired internet resource, even if it does not have them in its own records.

Once the terminal 2 has the IP address of the resource, it can use the IP address to send a message to the resource over the wireless network 6 and/or Internet 8, e.g. requesting web content from the IP address of a web site at a web server on the Internet 8, or sending an email to another terminal on the Internet 8 or wireless network 6.

Note that the domain name and corresponding IP address could identify a resource that is either internal to the cellular network 6 or that is external to it on the Internet 8. In the case where the host terminal 2 is accessing a resource internal to the 3GPP network or other such cellular network 6 (e.g. sending an email to another user of the mobile network 6), the resolved IP address of the resource need only be a private, internal IP address that identifies the resource within the 3GPP network 6, but does not necessarily identify the resource or not necessarily valid externally on the Internet 8. In the case where the resource is external on the other hand (e.g. a website on a web server), the resolved IP address will be a public, external IP address that identifies the resource externally on the Internet 8.

Either way, the arrangement of host 2 and modem 4 needs to be configured with the address of one or more designated DNS servers 9 or 9' which it will query to achieve DNS address resolution, and these addresses are provided to the modem 4 by the GGSN 7. In embodiments the GGSN may provide an address of a primary DNS server and at least one redundant secondary DNS server address for use as a back-up in case the primary server is unavailable. In one embodiment, at least the primary DNS server and typically also the secondary DNS server is a server 9 within the 3GPP network 6. However, one or more of the designated DNS servers could alternatively be external servers 9' on the Internet 8. According to current 2G and 3G standards the GGSN 7 can only provide a primary and secondary DNS address, but other standards or modifications to these standards could permit the GGSN 7 or other gateway support entity to provide any number of redundant DNS addresses.

In 3GPP environment, the DNS server addresses are provided to the modem 4 by the GGSN 7 in a Packet Configuration Option field of various messages such as Activate PDP Context Accept.

However, a problem occurs for example when the host's operating system doesn't offer a standard way of automatically configuring a designated DNSv6 address.

In this case either the user has to enter the DNS address manually or a residing application has to retrieve the addresses from the modem 4 and force them in the interface configuration. I.e. the user or the Connectivity Manager could configure the Connection with a specific DNS address that the modem would be able to recognize.

If neither of these things happens, the host 2 will have no designated DNS address configured and it will use one or more default local addresses. For example the host 2 may use by default three local addresses called "well-known DNS addresses":
FEC0:0:0:FFFF::1
FEC0:0:0:FFFF::2
FEC0:0:0:FFFF::3.

The disclosure provides an embodiment in this situation where the modem 4 is configured so that when it detects an IPv6 DNS query sent to one of the default addresses it will replace it by the addresses provided by the GGSN 7:
FEC0:0:0:FFFF::1 will be replaced by the primary DNSv6 address if available; and
FEC0:0:0:FFFF::2 will be replaced by the secondary DNSv6 address if available.

The modem 4 is also configured so that the same operation (in reverse) takes place in the downlink—when receiving a DNS response from a primary DNSv6 address the modem 4 will translate it into FEC0:0:0:FFFF::1, and when receiving a DNS response from a secondary DNSv6 address it will translate this into FEC0:0:0:FFFF::2.

The host 2 will never know the real DNS addresses but will receive name resolutions as expected.

Figure 2:
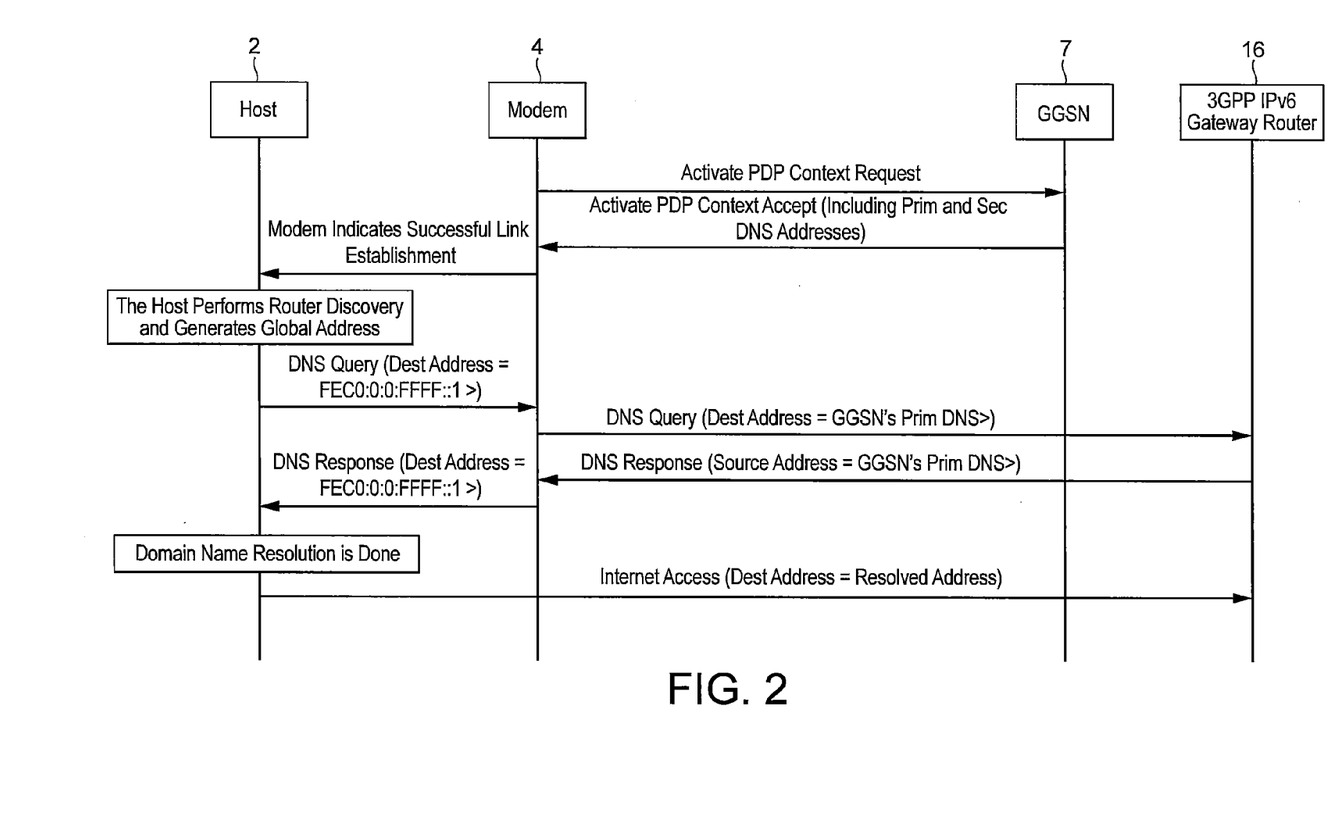
FIG. 2 is a signalling chart of a DNS address resolution method.

FIG. 2 is a signalling chart illustrating a method implemented by the modem 4 according to an embodiment of the disclosure.

At step S10 of FIG. 2, the modem 4 sends a request to establish a context 20 to the GGSN 7 via the first interface apparatus 31, 5 and wireless cellular network 6 ("Activate PDP Context Request"). At step S20 the GGSN 7 processes this request and sends back a response accepting the establishment of the context 20 to the modem 4, via the mobile network 6 and first interface apparatus 31, 5 ("Activate PDP Context Accept"). This response includes an address of one or more designated DNS severs intended to be queried by the arrangement of host 2 and modem 4. In this example the response includes an address of a primary DNS server and an address of a secondary DNS server.

According to one embodiment, the disclosure provides special DNS translator code 35 installed on a non-transitory computer-readable storage medium 34 of the modem 4 and arranged to run on the processing apparatus 33 of the modem 4. At the completion of step S20, the translator 35 stores the designated DNS addresses received from the GGSN on a storage medium 34 of the modem 4 (not necessarily the same physical storage device as stores the translator or modem code, though it could well be).

At step S30, the modem 4 signals successful establishment of the context to the host 2, via the second interface apparatus 32 (e.g. USB connector). However, the modem 4 may be unable to cause the host 2 to adopt the designated primary and secondary DNS server addresses in its configuration, e.g. because the operating system running on the host 2 does not provide a standard, compatible or otherwise suitable mechanism for configuring designated DNS addresses.

At step S40, the host 2 performs a router discovery process to find the router 16 and to generate a source address to identify itself to the router 16. Such a process will be familiar to a person skilled in the art, and is prescribed for example in the 3GPP standards.

At step S50 the host 2 formulates a DNS query message comprising, as the subject of the query, the domain name of an IP resource desired by a user of the host terminal 2; and, as its notional "destination" address, a default address which in this example is FEC0:0:0:FFFF::1. Step S50 continues with the host 2 sending this DNS query to the modem 4 via the second interface apparatus 32.

At step S60, the translator 35 running on the modem 4 intercepts the DNS query from the host 2, and detects that it contains a default destination address (or at least that it does not include the stored designated address supplied by the GGSN 7 as its destination address). Assuming it does detect this, the modem's translator 35 replaces the default destination address in the query with the designated address supplied by the GGSN 7, and continues with step S60 by retransmitting the query to the designated DNS server 9 with that server's address as the destination address, via the first interface apparatus 31,5 and mobile network 6.

At step S70, the designated DNS server 9 responds to the modem 4 with a DNS response message, via the mobile network 6 and first interface apparatus 31, 5. The response comprises, as the resolved answer to the query, the IP address of the resource desired by the user; and, as a source address, the IP address of the designated DNS server 9—in this example, the primary DNS address.

At step S80, the translator 35 running on the modem 4 translates the designated DNS address, e.g. primary DNS address, back into the default address used by the host 2, in this example FEC0:0:0:FFFF::1. The modem 4 then retransmits the response to the host 2 with the default address as the source address, via the second interface apparatus 32 (e.g. USB connector).

At step S90 the host 2 recognizes the response from the translated source address and determines the resolved IP address of the user's desired IP resource based on the DNS response. At step S100, the relevant application 18 on the host 2 then uses this IP address to access the desired IP resource, e.g. to access a website or send an email.

It will be appreciated that the above embodiments have been described only by way of example, and other variants or applications may be apparent to a person skilled in the art given the disclosure herein.

For instance, while embodiments above have been described in relation to certain standards such as 3GPP networks, Internet Protocol, IPv6 and so forth, these are not intended to be limiting and the disclosure may in fact be applied within any communication standard of any mobile cellular network, and of any further, packet-based network if such a network is involved. Further, while the above has been described in terms of a GGSN, a domain name system, DNS servers and DNS queries, it will be understood that these are examples and the above description could equally be made by reference to any gateway support entity, any name-to-address resolution system, and any form of name-to-address resolution server and query respectively. For example in an LTE core network, the gateway support entity could be an SAE gateway rather than a GGSN.

Generally, the disclosure is applicable in any scenario where a terminal attempts to access packet-based communications via a modem and wireless cellular network, but where the terminal sends out a name-to-address resolution query of any name-to-address resolution system using a destination address other than the address of a name-to-address resolution server provided to the modem by the wireless cellular network.

Note also that while the above has been described in terms of an external modem housed in a separate unit than the host terminal, the modem could alternatively be embedded in a desktop or laptop computer or even in a tablet or smartphone. In this case the second interface apparatus would be a wired interface such as a bus or dedicated interconnect internal to the host's housing, between a central processing unit of the host 2 and the modem 4 implemented on different chips. The same problem could well still occur if the modem and the terminal's CPU (or the operating system running on it) are not tightly coupled with a proprietary interface between them, e.g. if the modem and the host's operating system are running on different processors and/or different chips communicating together through interfaces such as for example Dialup or Ethernet Adaptor. The disclosure could find an application in an internal modem in this kind of set up. Such a scenario could occur for example where the modem 4 takes the form of an internal wireless data card in a laptop or desktop computer, e.g. installed as a non-proprietary add-on by the user (not provided by the maker of the host terminal 2 itself and/or its operating system), and where the operating system on the host 2 is not configured or written to provide the modem 4 with a way of configuring DNS address(es).

The disclosure is not limited by the example embodiments but only by the appended claims.

The invention claimed is:

1. A modem for use at a terminal, the modem comprising:
   first interface apparatus comprising a first wireless transceiver arranged to connect to a wireless cellular network;
   second interface apparatus arranged to connect to the terminal; and
   processing apparatus configured to perform operations of a wireless cellular modem so as to enable the terminal to access packet-based communications via the second interface apparatus, first interface apparatus and wireless cellular network;
   wherein the processing apparatus is arranged to receive at least one first address from the wireless cellular network via the first interface apparatus, the first address being an address of a server of a name-to-address resolution system; and
   wherein the processing apparatus is configured to intercept, via the second interface apparatus, a name-to-address resolution query being conveyed from the terminal to the wireless cellular network comprising a second address as a destination address, to translate the second address into the first address, and to retransmit the query to the wireless cellular network via the first interface apparatus with the first address as the destination address so as to access the packet-based communications.

2. The modem of claim 1, wherein: the processing apparatus is configured such that said access to packet-based communications comprises access to a further, packet-based network via the wireless cellular network; said query being so as to access the further network via the wireless cellular network.

3. The modem of claim 1, wherein: the processing apparatus is configured to send a request message via the first interface apparatus requesting establishment of a context with the wireless cellular network, and in response to receive back an acceptance message from the wireless cellular network accepting establishment of the context, the acceptance message comprising said at least one first address.

4. The modem of claim 1, wherein: the processing apparatus is configured to intercept at least one name-to-address resolution response being conveyed from the server comprising the first address as a source address, to translate the first address into the second address, and to retransmit said response to the wireless cellular network with the second address as the source address.

5. The modem of claim 1, wherein: the processing apparatus is configured to receive a plurality of first addresses from the wireless cellular network via the first interface apparatus, each first address being an address of a respective server of a name-to-address resolution system; and the processing apparatus is configured to intercept, via the second interface apparatus, a name-to-address resolution query being conveyed from the terminal to the wireless cellular network comprising any one of a plurality of second addresses as a destination address, to translate said one of the second addresses into a respective one of the first addresses, and to retransmit the query to the wireless cellular network with the respective first address as the destination address so as to access the packet-based communications.

6. The modem of claim 1, wherein the second address is a default address generated by the terminal.

7. The modem of claim 1, wherein the processing apparatus is unable to cause the terminal to accept the first address.

8. The modem of claim 1, wherein the processing apparatus is configured to detect that the second address is not the at least one first address, and to perform said translation on condition of said detection.

9. The modem of claim 6, wherein the processing apparatus is configured to detect that the second address is a default address, and to perform said translation on condition of said detection.

10. The modem of claim 6, wherein the second address is a default address generated by an operating system of the terminal.

11. The modem of claim 10, wherein the processing apparatus is unable to cause the terminal to accept the first address due to the operating system of the terminal.

12. The modem of claim 1, wherein the further network is the Internet.

13. The modem of claim 1, wherein the wireless cellular network is a 3GPP network.

14. The modem of claim 1, wherein the second interface apparatus comprises a wired connector or connection.

15. The modem of claim 1, wherein the modem comprises an external unit for use at the terminal.

16. The modem of claim 15, wherein the second interface apparatus comprises a wired connector.

17. The modem of claim 15, wherein the modem comprises a dongle housing said processing apparatus and for plugging into said terminal via the second interface apparatus.

18. The modem of claim 15, wherein the second interface apparatus comprises a second wireless transceiver for connecting to the terminal via a local wireless connection.

19. The modem of claim 1, wherein the modem comprises a mobile phone housing said processing apparatus and for connecting to said terminal via the second interface apparatus, the mobile phone thus being operable as a telephone and as an external wireless cellular modem for the terminal.

20. A computer program product for operating a modem for use at a terminal, the modem having a processing apparatus, a first interface apparatus comprising a first wireless transceiver for connecting to a wireless cellular network, and a second interface apparatus for connecting to the terminal;
   wherein the computer program product comprises code embodied on a non-transitory computer-readable medium and configured so as when executed on the processing apparatus of said modem to perform operations of a wireless cellular modem so as to enable the terminal to access packet-based communications via the second interface apparatus, first interface apparatus and wireless cellular network, including to perform operations of:

receiving a first address from the wireless cellular network via the first interface apparatus, the first address being an address of a server of a name-to-address resolution system;

intercepting, via the second interface apparatus, a name-to-address resolution query being conveyed from the terminal to the wireless cellular network comprising a second address as a destination address;

translating the second address into the first address; and retransmitting the query to the wireless cellular network via the first interface apparatus with the first address as the destination address so as to access the packet-based communications.

21. The computer program product of claim 20, wherein: the code is configured such that said access to packet-based communications comprises access to a further, packet-based network via the wireless cellular network; said query being so as to access the further network via the wireless cellular network.

22. The computer program product of claim 20, wherein: the code is configured so as when executed to send a request message via the first interface apparatus requesting establishment of a context with the wireless cellular network, and in response to receive back an acceptance message from the wireless cellular network accepting establishment of the context, the acceptance message comprising said at least one first address.

23. The computer program product of claim 20, wherein: the code is configured so as when executed to intercept at least one name-to-address resolution response being conveyed from the server comprising the first address as a source address, to translate the first address into the second address, and to retransmit said response to the wireless cellular network with the second address as the source address.

24. The computer program product of claim 20, wherein: the code is configured so as when executed to receive a plurality of first addresses from the wireless cellular network via the first interface apparatus, each first address being an address of a respective server of a name-to-address resolution system; and the code is configured so as when executed to intercept, via the second interface apparatus, a name-to-address resolution query being conveyed from the terminal to the wireless cellular network comprising any one of a plurality of second addresses as a destination address, to translate said one of the second addresses into a respective one of the first addresses, and to retransmit the query to the wireless cellular network with the respective first address as the destination address so as to access the packet-based communications.

25. The computer program product of claim 20, wherein the second address is a default address generated by the terminal.

26. The computer program product of claim 20, wherein the code is unable to cause the terminal to accept the first address.

27. The computer program product of claim 20, wherein the code is configured so as when executed to detect that the second address is not the at least one first address, and to perform said translation on condition of said detection.

28. The computer program product of claim 25, wherein the code is configured so as when executed to detect that the second address is a default address, and to perform said translation on condition of said detection.

29. The computer program product of claim 25, wherein the second address is a default address generated by an operating system of the terminal.

30. The computer program product of claim 29, wherein the code is unable to cause the terminal to accept the first address due to the operating system of the terminal.

31. The computer program product of claim 20, wherein the further network is the Internet.

32. The computer program product of claim 20, wherein the wireless cellular network is a 3GPP network.

33. A method of operating a modem connected to a terminal, the modem having a first interface apparatus comprising a first wireless transceiver for connecting to a wireless cellular network, a second interface apparatus for connecting to the terminal, and a processing apparatus for performing operations of a wireless cellular modem so as to enable the terminal to access packet-based communications via the second interface apparatus, first interface apparatus and wireless cellular network; wherein the method comprises:

at the processing apparatus of said modem, receiving a first address from the wireless cellular network via the first interface apparatus, the first address being an address of a server of a name-to-address resolution system;

intercepting at the processing apparatus of said modem, via the second interface apparatus, a name-to-address resolution query being conveyed from the terminal to the wireless cellular network comprising a second address as a destination address;

at the processing apparatus of said modem, translating the second address into the first address; and from the processing apparatus of said modem, retransmitting the query to the wireless cellular network via the first interface apparatus with the first address as the destination address so as to access the packet-based communications.

34. A system comprising:

a terminal;

a wireless cellular network; and a modem for use at the terminal, the modem comprising a first interface apparatus comprising a first wireless transceiver for connecting to the wireless cellular network, a second interface apparatus for connecting to the terminal, and processing apparatus configured to perform operations of a wireless cellular modem so as to enable the terminal to access packet-based communications via the first interface apparatus, second interface apparatus and wireless cellular network;

wherein the processing apparatus is arranged to receive a first address from the wireless cellular network via the first interface apparatus, the first address being an address of a server of a name-to-address resolution system; and wherein the processing apparatus is configured to intercept, via the second interface apparatus, a name-to-address resolution query being conveyed from the terminal to the wireless cellular network comprising a second address as a destination address, to translate the second address into the first address, and to retransmit the query to the wireless cellular network via the first interface apparatus with the first address as the destination address so as to access the packet-based communications.

* * * * *